United States Patent
Punathil et al.

(10) Patent No.: US 11,063,823 B2
(45) Date of Patent: Jul. 13, 2021

(54) INTER-SERVICE DATA TRANSPORTATION THROUGH DATA FRAGMENTATION AND SOCKET REPLICATION

(71) Applicant: International Business Machines Corporation, Armonk, NY (US)

(72) Inventors: Gireesh Punathil, Kannur (IN); Vipin M V, Palakkad (IN); Subrahmanya Chari Paradani, Horamavu (IN); Jayashree Shamkoor Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 16/445,753

(22) Filed: Jun. 19, 2019

(65) Prior Publication Data
US 2020/0403868 A1   Dec. 24, 2020

(51) Int. Cl.
*H04L 12/24*       (2006.01)
(52) U.S. Cl.
CPC ................ *H04L 41/0823* (2013.01)
(58) Field of Classification Search
CPC ........................................... G06F 8/447
See application file for complete search history.

(56) References Cited

U.S. PATENT DOCUMENTS

| | | |
|---|---|---|
| 5,867,661 A | 2/1999 | Bittinger |
| 9,110,680 B1 * | 8/2015 | Boynes ................... G06F 11/36 |
| 10,275,506 B1 * | 4/2019 | Schneider ............... G06F 16/27 |
| 2002/0199000 A1 * | 12/2002 | Banerjee ................. H04L 29/06 709/227 |
| 2003/0200282 A1 | 10/2003 | Arnold |
| 2003/0210711 A1 | 11/2003 | Faust |
| 2004/0019886 A1 | 1/2004 | Berent |
| 2006/0010238 A1 | 1/2006 | Craft |
| 2011/0208808 A1 | 8/2011 | Corbett |
| 2013/0191817 A1 | 7/2013 | Vorbach |
| 2015/0154011 A1 * | 6/2015 | Ceng ......................... G06F 8/51 717/137 |
| 2017/0244787 A1 | 8/2017 | Rangasamy |
| 2018/0109634 A1 * | 4/2018 | Lawson ................ H04M 15/52 |
| 2019/0007495 A1 | 1/2019 | Zhao |

FOREIGN PATENT DOCUMENTS

CN       109274722 A       1/2019

OTHER PUBLICATIONS

"Backpressure support", Issue #1089, Netflix/Hystrix, GitHub, Feb. 4, 2016, 6 pages, <https://github.com/Netflix/Hystrix/Issues/1089>.

(Continued)

*Primary Examiner* — William G Trost, IV
*Assistant Examiner* — Christopher P Cadorna
(74) *Attorney, Agent, or Firm* — Andrew Aubert

(57) ABSTRACT

Embodiments of the present invention are directed towards optimizing two or more services that exchange data over a communication network to send, receive and record data across a plurality of network connections, where each network connection is between two sockets, and modifying the communication network to, at least temporarily, assign a plurality of sockets for use by the two services to exchange data between them.

18 Claims, 5 Drawing Sheets

(56) References Cited

OTHER PUBLICATIONS

"Benefits and Challenges of Using Microservices with Big Data Applications", Aptude, Nov. 1, 2016, 12 Pages., <https://aptude.com/blog/entry/benefits-and-challenges-of-using-microservices-with-big-data-applications/>.

"Copy propagation", Wikipedia, This page was last edited on Mar. 7, 2018, at 07:13 (UTC), 1 page, <https://en.wikipedia.org/wiki/Copy_propagation>.

"Data-flow analysis", Wikipedia, This page was last edited on Feb. 20, 2019, at 14:24 (UTC), 7 pages, <https://en.wikipedia.org/wiki/Data-flow_analysis#Forward_Analysis>.

"How We Implemented (and Secured) a Big Data Microservices Infrastructure", insideBIGDATA, Apr. 16, 2018, 5 pages, <https://insidebigdata.com/2018/04/16/implemented-secured-big-data-microservices-infrastructure/>.

Bailey, Chris, "Fullstack Development and Agile UX Teams", Chart 91, Published Feb. 27, 2018, 2 pages, <https://www.slideshare.net/cnbailey/index-fullstack-development-and-agile-ux-teams>.

Davidson, Mike, "Data Integration Design Patterns With Microservices—A Story of BI, BIG Data and SQL Server in Canada", downloaded from the internet on Mar. 29, 2019, 3 pages, <https://blogs.technet.microsoft.com/cansql/2016/12/05/data-integration-design-patterns-with-microservices/>.

Scott, Jim, "Using microservices to evolve beyond the data lake", This blog was published Mar. 28, 2017, <https://mapr.com/blog/using-microservices-evolve-beyond-data-lake/>, 4 pages.

\* cited by examiner

INTER-SERVICE DATA TRANSPORTATION THROUGH DATA FRAGMENTATION AND SOCKET REPLICATION

BACKGROUND

The present invention relates generally to the field of data communications between software services, and more particularly to network socket usage for inter-service data communications.

Microservices are the result of an off-shoot of the service-oriented architecture (SOA) architectural style that structures an application as a collection of loosely coupled services. In a microservices architecture, protocols are designed to be lightweight and services fine-grained as opposed to traditional SOA style applications.

Many applications rely on computer networks to transport data or information between applications hosted on separate computers connected to a network. A network socket is an internal endpoint for sending or receiving data within a node on a computer network. Network socket is also frequently invoked to describe, the representation of this endpoint in networking software (protocol stack), for example, an entry in a table (destination, status, listing communication protocol, etc.) and is one type of system resource. The distinctions between a socket (internal representation), socket descriptor (abstract identifier), and socket address (public address) are subtle, and specific definitions of a "socket" frequently refer specifically to an internet socket or TCP socket. An internet socket is typically characterized by at least the following: (i) local socket address including the local IP address and (for TCP and/or UDP sockets, but not IP) a port number; and (ii) a transport protocol, e.g., TCP, UDP, raw IP, etc. This means that (local or remote) endpoints with UDP port 53 and TCP port 53 are distinct, separate sockets while IP does not have/use ports.

A socket that has been connected to another socket for example, during the establishment of a TCP connection, also will have a remote socket address. A socket is referred to by a unique integer value called a socket descriptor within the operating system (OS) and the application that created the socket. A payload of incoming IP packets is forwarded by the OS to the corresponding application by retrieving socket address information from headers for the IP and transport protocols and stripping the headers from the application data.

SUMMARY

According to an aspect of the present invention, there is a method, computer program product and/or system for use with a computer network including a plurality of network sockets that performs the following operations (not necessarily in the following order): (i) receiving a software services data set including at least a first service and a second service, where each service includes a corresponding set of machine language and the first and second service are connected by a first network socket; (ii) determining, through machine logic, for at least the first and second service, that the first service writes a first data set to the second service over the computer network; (iii) optimizing, automatically and without human intervention through machine logic: (a) at least some of the set of machine language of the first service to write the first data set in a plurality of data set fragments over the computer network, and (b) at least some of the set of machine language of the second service to receive and recompile the plurality of data set fragments into the first data set; and (iv) modifying, automatically and without intervention through machine logic, the computer network to assign a plurality of network sockets between the first service and the second service for communicating the plurality of data set fragments in addition to the first network socket.

DETAILED DESCRIPTION

Figure 1:
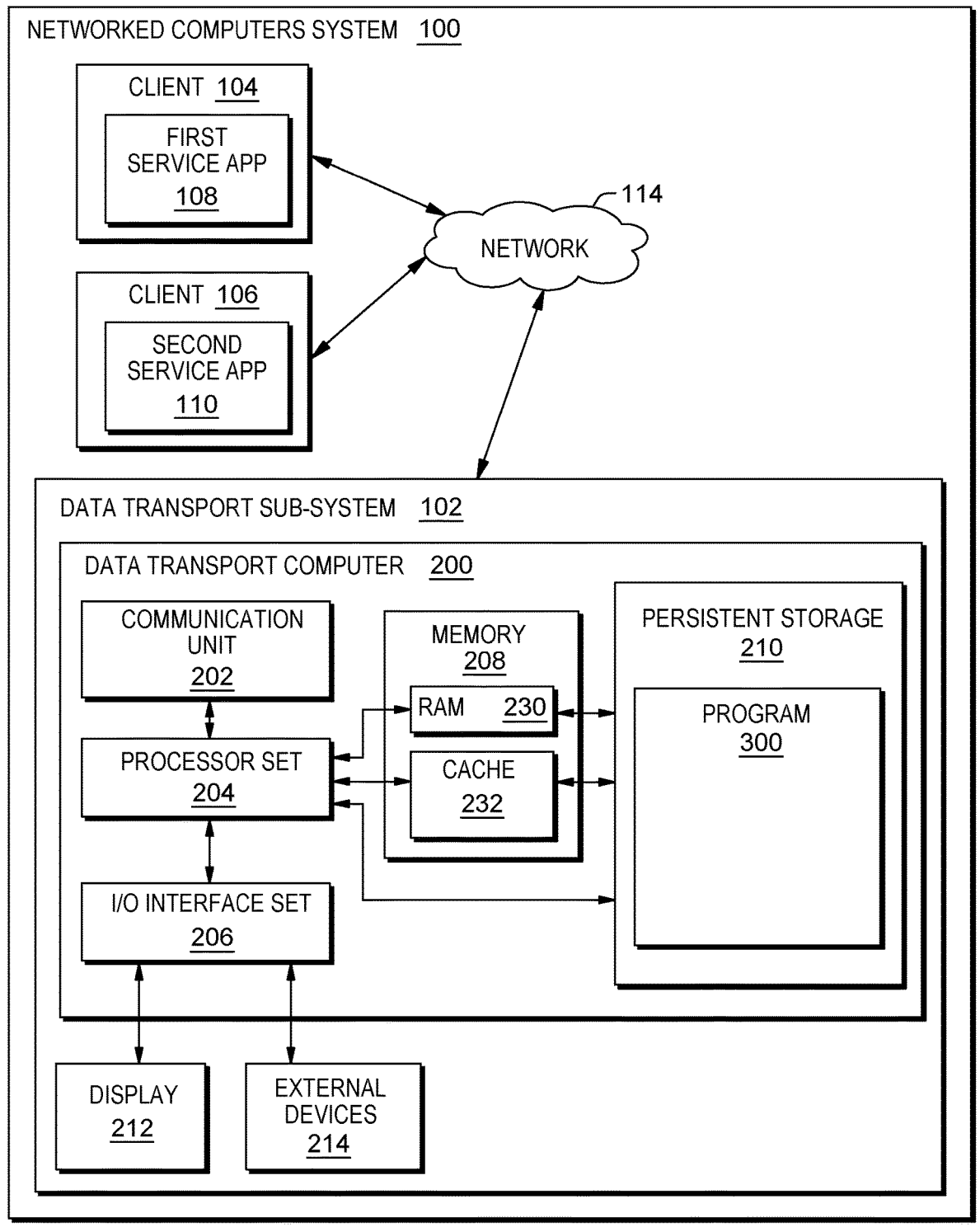
FIG. 1 is a block diagram view of a first embodiment of a system according to the present invention.

Embodiments of the present invention are directed towards improvements to transporting information between software applications (or services) over one or more network interfaces. These improvements include altering machine language of two communicating services to create, send, and receive data as segmented, incremental "chunks" and sending these chunks over a plurality of additional network sockets than traditionally assigned for communications between the two services. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: data transport sub-system 102; client sub-systems 104 and 106; first service app 108; second service app 110; communication network 114; data transport computer 200; communication unit 202; processor set 204; input/output (I/O) interface set 206; memory device 208; persistent storage device 210; display device 212; external device set 214; random access memory (RAM) devices 230; cache memory device 232; and program 300.

Data transport sub-system 102 is, in many respects, representative of the various computer sub-system(s) in the present invention. Accordingly, several portions of data transport sub-system 102 will now be discussed in the following paragraphs.

Data transport sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Data transport sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Data transport sub-system 102 is shown as a block diagram with many double arrows. These double arrows (no separate reference numerals) represent a communications fabric, which provides communications between various components of data transport sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for data transport sub-system 102; and/or (ii) devices external to data transport sub-system 102 may be able to provide memory for data transport sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to data transport sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with data transport computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
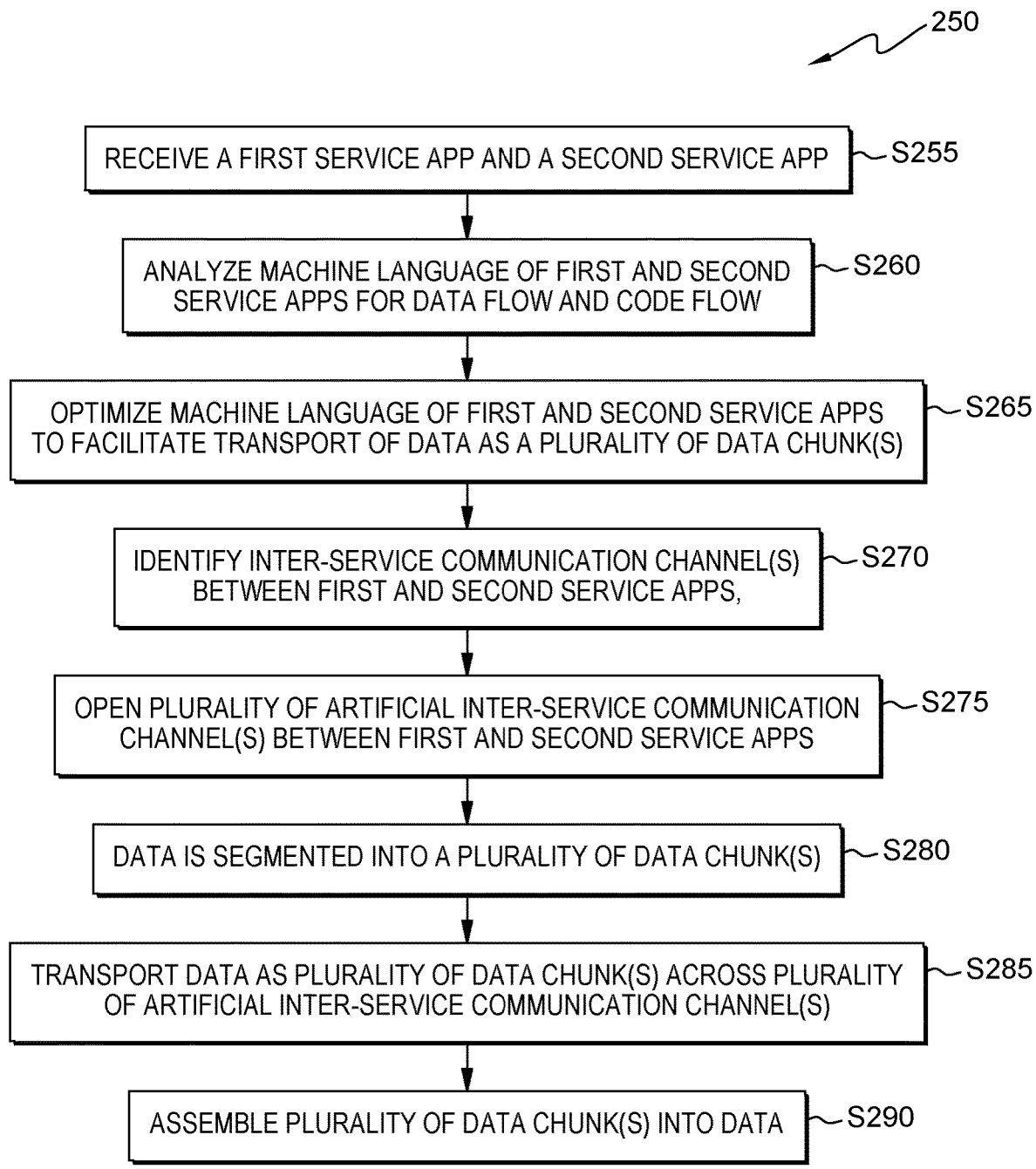
FIG. 2 is a flowchart showing a first embodiment method performed, at least in part, by the first embodiment system.
Figure 3:
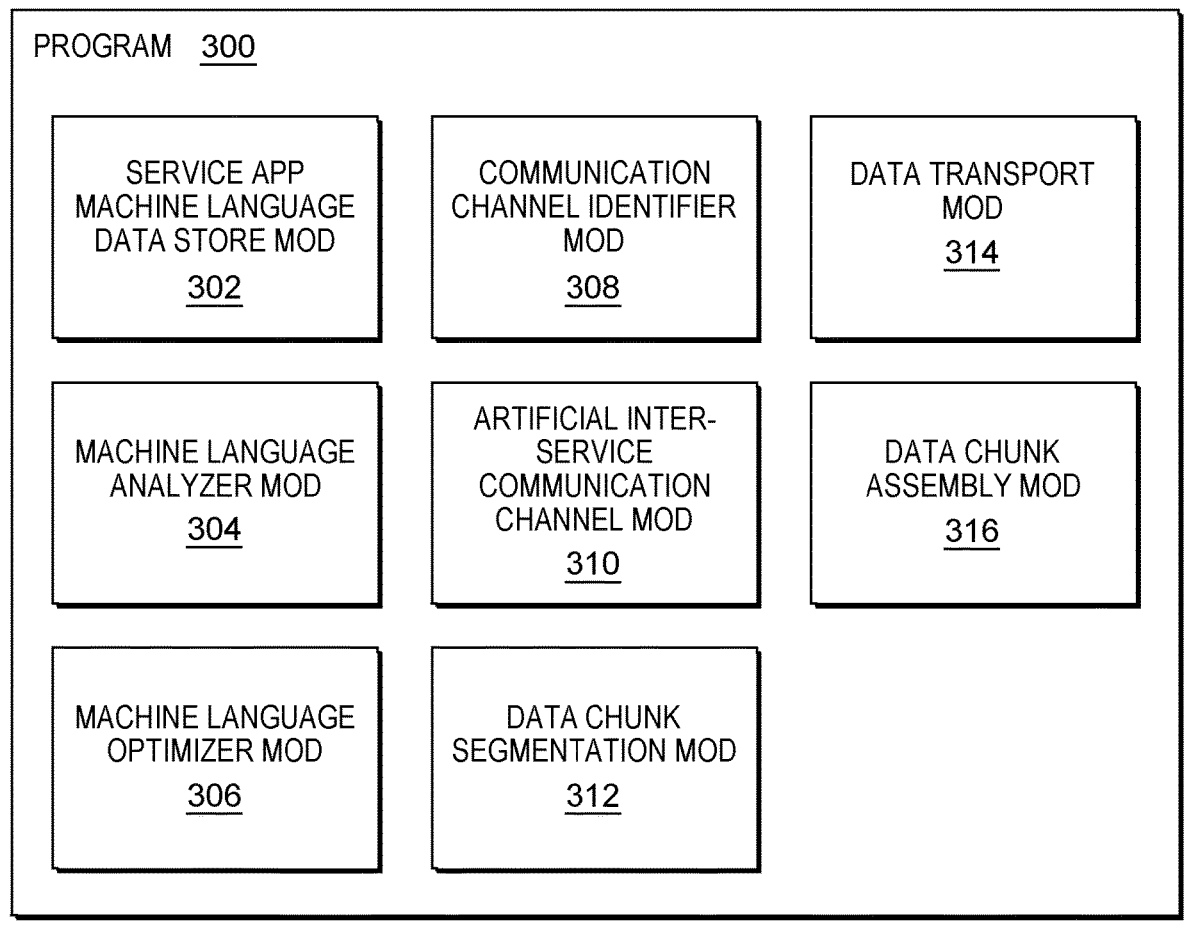
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where service app machine language data store module ("mod") 302 receives a first service app and a second service app. In this simplified embodiment, machine language corresponding to the first service app and the second service app, each a software application designed and written according to a microservice architecture, is received by mod 302 and stored within. In this embodiment, the first service app, initially stored as first service app 108 on client 104 of FIG. 1, includes functionality that includes transporting a data set from the first service app 108 to the second service app 110 of client 106. Also, the second service app, initially stored as second service app 110 of client 106, includes functionality for receiving the data set from the first service app 108 of client 104. For the purposes of this simplified embodiment, the size of the data set is two kilobytes (KB). In alternative embodiments, the data set can be any size of electronic information, such as any number of bits, bytes, kilobytes, megabytes, gigabytes, terabytes, etc. Alternatively, the first service app and the second service app can be any set of machine language that requires communicating with another set of machine language over a network. For example, services according to typical service oriented architecture (SOA), traditional monolithic software programs, etc. For the purposes of this simplified embodiment client 104 and client 106 each have a total of two sockets, sockets 42 and 43 (not shown). Typical computers known in the art have upwards of 65,535 ports for TCP connections and another 65,535 ports for UDP connections, where the number is defined as the highest number represented by an unsigned 16-bit binary number, minus port 0 which is typically reserved.

Processing proceeds to operation S260, where machine language analyzer mod 304 analyzes the machine language of the first service app and the second service app for data flow and code flow. In this simplified embodiment, mod 304 searches the machine language of the first service app for machine language corresponding to creating data, such as the data set, and outputting the data, such as the data set, to the second service app. In this simplified example embodiment, the first service app includes 100 lines of machine language, with lines 30 through 60 corresponding to creating the data set from a set of received inputs and lines 61 through 80 corresponding to outputting the data set to any service app that calls the first service app (for example, the second service app asking for output from the first service app) via socket 42. Also, in this simplified embodiment sockets (such as socket 42) have a one KB buffer size. The size of buffers for sockets may be limited at the operating system level of a computer, limiting the amount of memory available to any given socket and how much data can be loaded into the given sockets buffer at any given time. Additionally, in this simplified embodiment, data communications between sockets take place in the form of packets, where one packet is one byte in size and each socket-to-socket connection can communicate one packet per second for a rate of one byte per second per socket-to-socket connection. If executed as presently written and analyzed by mod 304, when the machine language of the first service app creates the data set, the data set is two KB large. When the data set is to be output via socket 42 of client 104 of FIG. 1 (not shown), the buffer for socket 42 of client 104 of FIG. 1 (not shown) stores a first KB of the data set. After the first KB is outputted from the buffer via socket 42 of client 104 of FIG. 1 (not shown), a second KB, what remains of the data set, is loaded into the buffer for outputting.

Additionally, mod 304 searches the machine language of the second service app for machine language corresponding to receiving the data set via socket 42 and how the data set is stored locally, relative to the second service app. In this simplified example embodiment, the second service app includes 120 lines of machine language, with lines 20-30 corresponding to receiving the data set via socket 42 and lines 31-35 corresponding to how the data set is stored locally relative to the second service app. When the second service app receives the data set over socket 42, it is stored in a one KB buffer before being stored locally relative to the second service app. When the buffer is full or the transmission of the data set terminates, the buffer is flushed to local memory. If the transmission is not terminated, the flushed buffer begins receiving the remainder of the data set (in order to eventually be flushed into local memory to complete the data set present in local memory). In this simplified example, if executed as presently written, the machine language of the second service app receives the first KB of the data set, one packet at a time, at a rate of one byte per second, via socket 42 of client 106 of FIG. 1 (not shown). After the buffer of socket 42 of client 106 of FIG. 1 (not shown) receives the first KB and is full, the buffer is flushed into local memory of client 106 of FIG. 1 (not shown) to make room in the buffer for the second KB. In this simplified embodiment, if executed as presently written, the machine language of the first service app and the second service app would result in data transportation of the data set at a rate of one byte per second, which would take 2000 seconds to complete.

In alternative embodiments, the machine language may be any machine language suitable for creating and executing sets of machine instructions that send or receive data to other sets of machine instructions. A non-exhaustive list of some example machine languages suitable for this purpose includes: (i) Java; (ii) C#; (iii) C; (iv) Ruby; (v) Python; (vi) C++; (vii) Clojure; (viii) Go; (ix) Hy; (x) Node; (xi) Perl; (xii) Python; and (xiii) Rails.

Processing proceeds to operation S265, where machine language optimizer mod 306 optimizes parts of the machine language of the first service app and the second service app to facilitate transport of data as a plurality of data chunk(s). In this simplified embodiment, mod 306 modifies the machine language of the first service app 108 of client 104 of FIG. 1 in the following ways. First, the machine language corresponding to creating the data set, which is lines 30 through 60, is optimized to write the data set into a series of incremental data chunks of one byte each, to match the packet size limit defined above, which would result in a series of 2000 data chunks being written. And second, the machine language corresponding to outputting the data set via socket 42 is modified to instead output each data chunk directly as it arrives by assigning it as a packet to either socket 42 or a second, yet to be defined socket, alternating which socket is assigned as each data chunk is written. In this way, the data set, as a series of data chunks, is assigned to one of two alternating sockets for outputting to the second service app without accumulating in the buffer of either socket, initiating transportation of the data chunk as they are written. In alternative embodiments, more than two sockets might be defined for use in this manner. For example, anywhere from 2 to 65535 ports may be used by embodiments of the present invention. In a typical microservices architecture, it is likely that many sockets will be available for use in this manner, such that performance improvements would be much more appreciable than using two sockets instead of one. In alternative embodiments, socket assignment could be distributed by other methods, such as round robin, random assignment, or a user-customized assignment method (for example, assigning to sockets 1 through 1000 in a round robin method during the time window of 9:00 AM to 5:00 PM and then from sockets 1001 through 10000 in a round robin method outside of that time window).

Also, in this simplified embodiment, mod 306 modifies the machine language of the second service app 110 of client 106 of FIG. 1 in the following ways. First, the machine language corresponding to receiving to the data set through socket 42, lines 20 through 30, is optimized to receive a sequence of packets containing data chunks from socket 42 and another, yet to be defined socket, and transfer the data chunks within the packets directly onto the language corresponding to how the data set is stored locally relative to the second service app, lines 31 through 35. Lines 31 through 35 are also optimized to write each incoming data chunk as an incremental write of the data set to local memory, relative to the second service app 110 of client 106 of FIG. 1, bypassing the buffers for socket 42 and the yet to be determined socket, such that, each data chunk is combined with any previously received and written data chunk and that, upon receiving all of the data chunks, a copy of the complete data set is a result. In alternative embodiments, the data chunks may be incrementally accumulated in the buffer before being saved to local memory.

Processing proceeds to operation S270, where communication channel identifier mod 308 identifies inter-service communication channel(s) between the first service app and the second service app. In this simplified embodiment, mod 308 identifies which socket(s) are presently assigned for use to facilitate data transportation between the first service app 108 of client 104 of FIG. 1 and the second service app 110 of client 106 of FIG. 1, and then identifies other potential sockets, such as, socket 43 (not shown), for use as an additional communication channel between the first service app and the second service app. In some alternative embodiments, mod 308 filters out sockets that are intended for other uses by either service app or their respective host clients, preventing their inclusion among the socket(s) used for communication between the two service apps. For example, one or more sockets may be reserved for communications with a third service app, which may be hosted on a third client (not shown), or for other purposes such as telemetry monitoring, auditing, error/bug reporting, etc.

Processing proceeds to operation S275, where artificial inter-service communication channel mod 310 opens a plurality of inter-service communication channel(s) between the first service app and the second service app. In this simplified embodiment, mod 310 opens up, allocates (or otherwise makes available for data transportation) socket 43 (not shown) on clients 104 and 106 of FIG. 1 specifically for use between the first service app 108 of client 104 of FIG. 1 and the second service app 110 of client 106 of FIG. 1, in addition to the already allocated socket 42 (not shown). This opening or allocation is temporary and is terminated after communication of all of the data chunks between the first service app and the second service app has been completed. In alternative embodiments, individual inter-service data communication operations (or pairs of connected services) can have a priority value assigned, where operations (pair of connected services) with a higher priority value may receive allocation of all sockets not individually assigned to a given operation or pair of services until their data operations are, at least presently, completed. As a further alternative, the allocation of sockets may be pro-rated based on the relative priority value of two or more competing operations (or pairs of services) and the quantity of potentially available sockets. In these alternative embodiments, the priority value can be defined in a variety of ways, including: (i) user defined; and (ii) inferred from one or more of the following: (a) relative frequency that the data operation (or pair of connected services) engages in data transportation between each service in the pair in comparison to other peer operation or services competing for sockets, (b) relative average size of the data set being transported as compared to the sizes of other data sets to be transported between other peer operations or services, and (c) relative encryption level or security settings for the data set relative to other data sets to be transported between other peer operations or services.

Processing proceeds to operation S280, where data chunk segmentation mod 312 segments a data set into a plurality of data chunk(s). In this simplified embodiment, mod 312 is representative of the optimizations made to machine language lines 30 through 60 of the first service app 108 of client 104 of FIG. 1, which creates a series of 2000 data chunks, each of a size of one byte, which would yield the data set if all of the data chunks were appended together.

Processing proceeds to operation S285, where data transport mod 314 transports data as a plurality of data chunk(s) across the plurality of artificial inter-service communication channel(s). In this simplified embodiment, mod 314 is representative of the optimizations made to machine language lines 61 through 80 of the first service app 108 of client 108 of FIG. 1 and machine language lines 20 through 30 of the second service app 110, as well as the plurality of artificial inter-service communication channel(s) (such as socket 43) and socket 42 of clients 108 and 110 of FIG. 1. In this simplified embodiment, data transportation of the plurality of chunks is achieved through alternating assignment of each data chunk to one of sockets 42 and 43, as each data chunk is created, until all 2000 chunks have been transferred. Through implementation of this simplified embodiment, the data transportation is completed approximately half as quickly as would be achieved through the original socket assignment arrangement. In alternative embodiments, the amount of sockets reassigned to a given inter-service communication can amplify data transportation speeds between two services more significantly.

Processing proceeds to operation S290, where data chunk assembly mod 316 assembles the plurality of data chunk(s) into the data set. In this simplified example embodiment, mod 316 is representative of the optimizations made to machine language lines 31 through 35 of the second service app 110 of client 106 of FIG. 1. As each data chunk is received it is immediately written to the local memory of client 106 (not shown), until all 2000 data chunks have been received by the second service app, which are recomposed into the complete data set. In some alternative embodiments, the data chunks may be saved to the buffers of each socket used by the second service app to receive the data chunks, before or in addition to being written to the local memory of client 106 of FIG. 1.

In this simplified embodiment, it is assumed that each service app, as it existed before application of the present embodiment, requires and uses only one socket for data communications with other service apps. In alternative embodiments, service apps of greater complexity may be designed to use more than one socket for data communications between service apps. In these alternative embodiments, it cannot be assumed that other sockets are available for use by the operations outlined above, which may now include additional operations (for example, filtering out sockets that are used for telemetry, auditing, etc.) to facilitate the enhanced communication technique outlined above without eliminating desired functionality.

III. Further Comments and/or Embodiments

Some embodiments of the present invention recognize the following facts, potential problems and/or potential areas for improvement with respect to the current state of the art: (i) microservice architecture specifies to de-compose large monolithic application into small services that are independently scalable, abstracts a logical unit of computation or a logical unit of data or both, and provides a network endpoint for accessing the service remotely; (ii) the most common enterprise deployments will leverage microservices in two forms: (a) mutually detached from each other while invoked and consumed by a central web application, and (b) connected microservices where one service depend on another for completing its functionality; (iii) either way, a typical use case will have a microservice exposing one or two network endpoints in a distributed computing system such as a cloud; (iv) one common deployment of a microservice is by packaging it inside a container; (v) a typical deployment model will also have one container hosting exactly one microservice; (vi) most of the distributed computing architecture is moving towards micro- of enhanced scalability and isolation; and (vii) with this architectural shift, the data exchange between internal execution sequences within the same virtual address space (in the traditional monolithic architecture) is now carried out through service invocations across the network, significantly adding to performance overhead.

Some embodiments of the present invention recognize the following facts, potential problems and/or potential areas for improvement with respect to the current state of the art: (i) microservices are capable of handling use cases that deal with large data, as typical definitions of microservice are very clear on code refactoring, isolation and maintainability, where the volume of data is never mentioned as a constraint; (ii) code is typically the outcome of a design, which gets refined and optimized as the design gets refined and optimized; (iii) data (both type and volume) is not a function of architecture, design or topology, and is instead driven by business requirements; (iv) consideration for microservices and their architecture may be influenced by logically coherent data, but not by their volume; (v) for example, a microservice passing an image (10 MB) to backend analytics service and availing a visual recognition response involves a large onward data flow; (vi) a microservice passing a hashtag to a backend social media API service and extracting statistics and sentiment on that involves a large return data flow; (vii) a microservice placing a query and extracting multimedia content from a NoSQL database (DB) involves large return data flow; (viii) a microservice extracting satellite imagery from an SQL DB, searches for patterns in it, transforms the image and stores it back involves both large onward and return data flows; and (ix) some example microservice use cases with big data: (a) messaging, (b) backpressure (receiving data during a temporary load spike faster than the system can process the received data), (c) integration (combining data from multiple sources into a single view), and (d) microservices coupled to databases.

Some embodiments of the present invention recognize the following facts, potential problems and/or potential areas for improvement with respect to the current state of the art: (i) microservice architecture specifies to de-compose large monolithic application into small services that are independently scalable, abstracts a logical unit of computation or a logical unit of data (or both), and provides a network endpoint for accessing the service remotely; (ii) the most common enterprise deployments will leverage microservices in two forms: (a) mutually detached from each other while invoked and consumed by a central web application, and (b) connected microservices where one service depends on another service for completing its functionality; (iii) either way, typical use cases will have a microservice exposing one or two network endpoints in a distributed computing system such as a cloud computing environment; (iv) also, typical deployments of a microservice is achieved by packaging it inside a container; and (v) additionally, typical deployment models will have one container hosting exactly one microservice.

Some embodiments of the present invention recognize the following facts, potential problems and/or potential areas for improvement with respect to the current state of the art: (i) a microservice is different from a service in that the former is a fine-grained version of the later; (ii) the fine-graining is decomposing a larger service into two or more software modules, where each can function independently; (iii) this independence is required for enhanced scalability, software maintainability, fault isolation, and security; (iv) among other things, a characteristic feature of a microservice is that it exposes a single software access interface (a network port) to the outside world, including its own peer microservices that when operated together constitute the application; (v) an end point is a uniquely identifiable software access point; (vi) in a distributed computing network, such as a cloud computing environment, this is a network port; (vii) a port is a network access point abstraction; (viii) a port is implemented by TCP/IP software in typical computing systems; (ix) a microservice has a single end point through which it receives the request from its consumer (software invoking the microservice) and optionally provides output; (x) there are no intermediate or start points in this context; (xi) microservices with no end points cannot be externally consumed and instead have to be self-sufficient and self-governing computational logics; (xi) one definition of proactive is creating or controlling a situation by causing something to happen rather than responding to it after it has happened; (xii) for example, in an application of the concept of proactive to some embodiments of the present invention, the situation is the data transport across two participating end points from two microservices; (xiii) an example of a typical data transfer mechanisms in this situation, which can be termed as a reactive approach, is the normal initiation of data transfer between the endpoints, as the destination endpoint responds to the write (I/O) from the source endpoint; (xiv) a proactive approach, such as implemented by some embodiments of the present invention, is to prepare the infrastructure of both the end points to take measures to send and receive large chunks of data volume through artificially created parallel endpoints; and (xv) this proactive measure leads to improved data transfer rates.

Some embodiments of the present invention recognize the following facts, potential problems and/or potential areas for improvement with respect to the current state of the art: (i) the opposite of a microservice in this context is a monolith application (with coarse-grained services and modules inside); (ii) for example, a monolith can be decomposed into several microservices as part of application modernization; (iii) on the other hand, developing fresh modern applications could be originally developed as microservices, with no decomposition involved, but the (micro)services are inherently fine-grained; (iv) plain old services also expose single interfaces to outside world, however due to the very nature of the application (being a coarse-grained monolith), it will contain several ports opened (for example, some for housekeeping purposes, some for administration, some for auditing, some for inter-modular data exchange etc.); and (v) while this difference is not a major differentiation between microservices and normal services, this difference is significant for some embodiments of the present invention.

Some embodiments of the present invention may include one, or more, of the following features, characteristics and/or advantages: (i) using a single known interface such as in microservices means that the rest of the available ports are free for using for any purposes, such as parallelizing data transport; (ii) on the other hand, in a monolith service it cannot be assumed that any arbitrary port is free for use; (iii) in some embodiments of the present invention, proactive writing means creating or controlling a data communication between two microservice endpoints by causing an initiation of the communication to occur under conditions where this initiation would not conventionally occur in prior art microservice computer systems; (iv) some embodiments of the present invention can be used in any type of service; (v)

however, given some noted differences between microservices and typical services (single endpoints), certain aspects of the present invention (port proliferation/multiplication) are more readily applicable, but still possible to implement in typical services; (vi) when implemented in typical services there is some degree of added complexity; and (vii) for example, filtering out used ports for a given service, etc.

Some embodiments of the present invention may include one, or more, of the following features, characteristics and/or advantages: (i) leveraging characteristics of the network topology as well as the containerized composition model of the microservices to amplify data transport across the endpoints in an exponential manner, thereby providing great throughput improvements to workloads that cater to systems of engagement that are coupled with systems of records; (ii) perform data flow and code flow analysis in the application code that undertakes the data transfer between the endpoints; (iii) identify the data chunk formation heuristics; (iv) identify chunks of data as and when they are formed; (v) take proactive and partial write decisions thereon; (vi) identify program control points where the life span of the network data in question is active; (vii) optimize the application code in such a manner to perform incremental and partial writes; (viii) establish or leverage an existing communication channel between two containers that host logically connected microservices; (ix) identify primary endpoint identifiers through which the data communication is performed between them; (x) artificially open up plurality of pseudo-sockets between the endpoints; (xi) spread the transport data into the I/O buffers of each of the pseudo-sockets; and (xii) transport them across the network in a multi-channel capacity, thereby improving the throughput in an exponential manner.

Some embodiments of the present invention may include one, or more, of the following features, characteristics and/or advantages: (i) leveraging characteristics of the network topology as well as the containerized composition model of typical microservice architecture, some embodiments of the present invention propose technology to amplify data transport across the endpoints in an exponential manner; (ii) providing improvements to workload throughput that cater to systems of engagement coupled with systems of records; (iii) a socket assignment technique that can assign sockets using a round robin technique, which assigns a server application to a first available socket; (iv) a random technique, which assigns a server application randomly to an available socket; (v) or a user-defined technique, which assigns a thread to an available socket as determined by a user; (vi) if the system already has other network oriented applications running, then usage of arbitrary sockets will not work properly; (vii) in this case, an embodiment system must look at the available (free) sockets that the applications can make use of; (viii) in an example, if an embodiment system receives around 1000 sockets, then distribution of those sockets among multiple threads can follow any of the said models: (a) round robin, (b) arbitrary, and (c) user-predefined; (ix) in a round-robin model, the thousand sockets are named and/or indexed based on their port numbers; (x) any thread which wants to transport data picks up the socket with lowest port number, and flag it as engaged; (xi) the next thread picks the next socket, and so on; (xii) in a random (also referred to as arbitrary) model, there are OS primitives that provide a free available socket within a range of possible sockets; (xiii) in an example user-defined model, threads are bound to specific sockets or socket ranges; (xiv) for example, if there are 100 threads that act on 1000 sockets in a range 12000 to 13000, the first thread always uses sockets with port numbers 12000-12009, second thread from 12010 to 12019 and so on; (xv) some parameters and conditions that control the decision on the selection of the which model to use will depend on the workload itself and the execution environment in the system itself; (xvi) for example, if the data flow rate from multiple threads are non-uniform (such as one thread transports 10 GB of data while another thread transports 1 MB or approximately one thousandth of a GB) then a random socket assignment is much better, for better buffer utilization; (xvii) if data transport is normalized across threads, then a round-robin or user defined method will be more efficient; (xviii) scoped in microservice topology wherein the network endpoints are well defined and precise; (xix) leveraging the container abstraction that is already available for hosting microservice applications, where the port abstractions are inherently managed; (xx) in some embodiments of the present invention, since both of the endpoints are predefined, statically known, and container abstracted (which keeps a 1λ1 relation), data transport is carried out in a truly parallel fashion; (xxi) this also enables a data consumer the capability to effectively de-multiplex the sockets to get data at a much higher rate; (xxii) split data into chunks and spread them into multiple sockets and ports; (xxiii) one example environment of practicing some embodiments of the present invention involving socket multiplexing includes a single application in a first computer communicating with a single application in a second computer, with large amount of data to be passed; and (xxiv) improve the data exchange between microservice endpoints, and thereby enabling highly scalable deployments that are high performant, thereby helps in gaining unprecedented competitive advantage in the Cloud computing.

Some embodiments of the present invention may include one, or more, of the following features, characteristics and/or advantages: (i) improve the network throughput of large data transfer between statically known endpoints; (ii) using typical network fabric with a customized network abstraction layer in the hosting container to replicate links; (iii) dividing the data into chunks and dispatch them independently into replicated sockets; (iv) dynamically adjust socket replication based on demand, workload characteristics and heuristic pattern; (v) trace code flow of microservice applications that process network data from a point where the data materializes leading up to a program control point where it is transferred to the kernel buffer(s) through transmission control protocol (TCP) subroutine calls; (vi) using data flow and code flow analysis technique on network data to optimize application logic transport incrementally generated data; (vii) the actual data is not modified/cached etc.; (viii) technology to improve the data transfer rate between endpoints; (ix) some embodiments of the present invention do code flow and data flow analysis, but do not perform loop unrolling or loop parallelism to improve code execution performance; (xi) instead, some embodiments of the present invention detect control flow edges where data pertinent to the network traffic emerges and then tracks the data until such a point where it escapes into the network; and (xii) this analysis data is used to perform incremental inline writing into the network.

Some embodiments of the present invention may include one, or more, of the following features, characteristics and/or advantages: (i) perform data flow and code flow analysis in the application code that undertakes the data transfer between the endpoints; (ii) identify the data chunk formation heuristics; (iii) identify chunks of data as and when they are formed; (iv) take pro-active and partial write decisions thereon; (v) identify program control points where the life span of the network data in question is active; (vi) optimize the application code in such a manner to perform incremental and partial writes; (vii) establish or leverage an existing communication channel between two containers that host logically connected microservices; (viii) identify the primary endpoint identifiers through which the data communication is performed between them; (ix) artificially open up plurality of pseudo-sockets between the endpoints; (x) spread the transport data into the I/O buffers of each of the pseudo-sockets; and (xi) transport them across the network in a multi-channel manner, thereby improving the throughput in an exponential manner.

Figure 4:
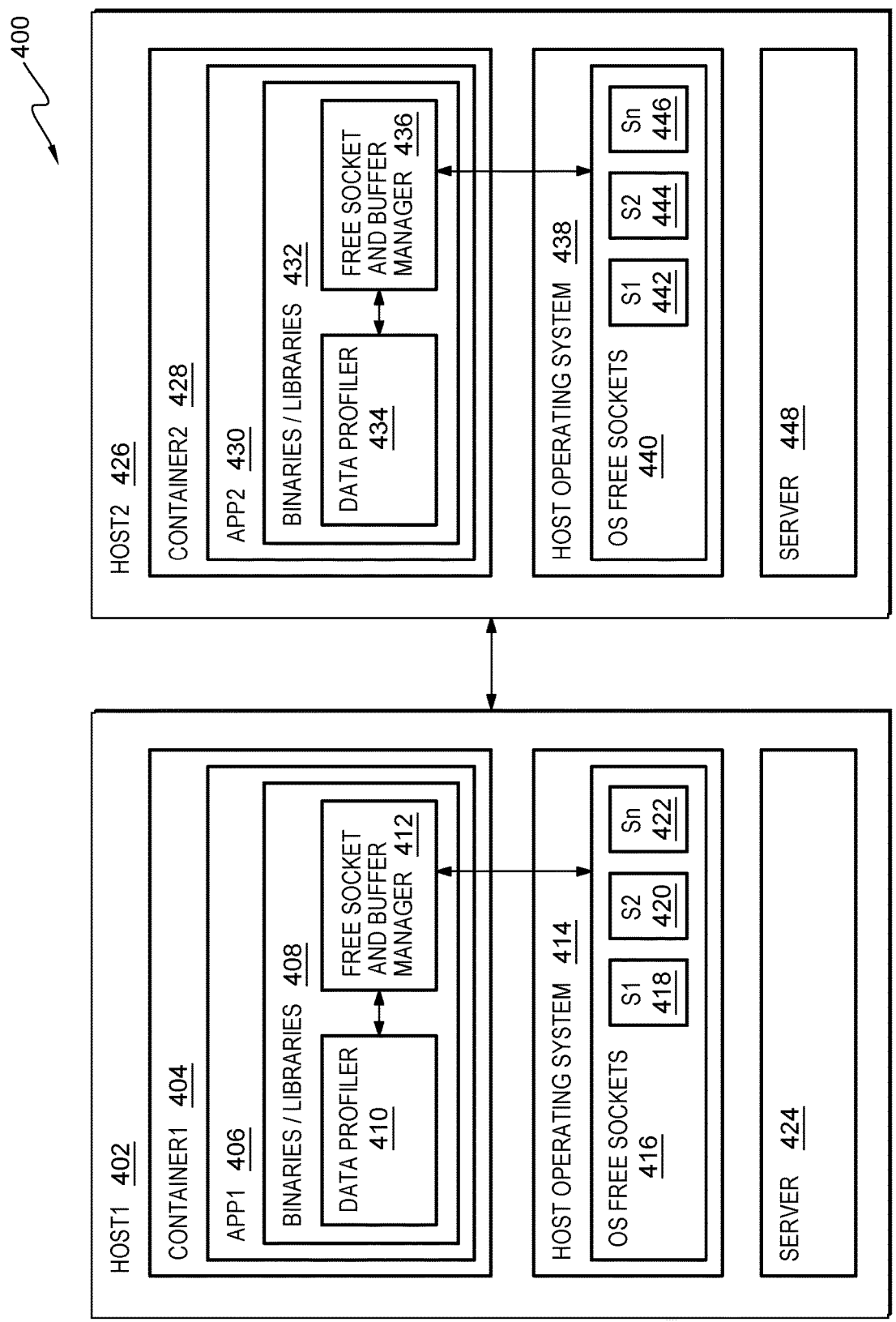
FIG. 4 is a block diagram of a network topology of a second embodiment system.

Some embodiments of the present invention rely on a network topology as described in diagram 400 of FIG. 4. Diagram 400 includes: (i) a host server computer system host1 402; (ii) a container software unit container1 404; (iii) a containerized application app1 406; (iv) a software module including binaries/libraries 408; (v) data profiler 410, a software sub-module of 408; (vi) free socket and buffer manager 412, a software sub-module of 408; (vii) a host operating system 414 of host1 402; (viii) a set of OS Free Sockets 416, including (a) a first socket S1 418, (b) a second socket S2 420, and (c) a plurality of sockets Sn 422; (ix) server 424; (x) a host server computer system host2 426; (xi) a container software unit container2 428; (xii) a containerized application app2 430; (xiii) a software module including binaries/libraries 432; (xiv) data profiler 434, a software sub-module of 432; (xv) free socket and buffer manager 436, a software sub-module of 432; (xvi) a host operating system 438 of host2 426; (xvii) a set of OS Free Sockets 440, including (a) a first socket S1 442, (b) a second socket S2 444, and (c) a plurality of sockets Sn 446; and (xviii) server 448.

A high-level example of microservice endpoint code, abstracted from the some embodiments of the present invention is as follows:

```
function client(datasource, socket) {
    datasource.on('data', (d) => {
        if (d.includes(predicate))
            buf += d
    })
    datasource.on('end', ( ) => {
        socket.send(buf)
    })
}
```

Depending on the exact nature (such as service consumer versus service provider) of the microservice, the above example code can be reversed (read operations as opposed to write), and the above example code is highlighted for illustrative purposes only.

One high-level example of container code for abstracting a network send method and leveraging host system services to actually realize a write operation is described as follows:

```
static int tcp_send(int fd, char *ptr, int len) {
    card *c = fd->card;
    kernel_thread t = ___getfree( );
    t->dispatch(c, ptr, len);
}
```

A low-level example of a system service that actually performs the network write is described as follows:

```
static int ___tcp_send(card *c, char *ptr, int len){
    c->_write(HEADFLAG),1);
    for (i = 1; i < len; i++)
        c->_write(ptr[i], 1);
    c->_write(FOOTERFLAG);
}
```

A high-level example of container code that is modified to catered to making use of artificial endpoints to distribute the work as described in some embodiments of the present invention is as follows:

```
static int wrap___tcp_send(int fd, char *ptr, int len){
    int stored_fd = cache_get(REAL_PEER);
    if (stored_fd != fd)
        return ___tcp_send(fd, ptr, len);
    card *c = fd->card;
    int [ ]workers = cache_get(WORKERCHANNEL);
    int workercount = strlen(workers);
    int chunk = len / workercount;
    for (i=0; i < workercount; i++){
        kernel_thread t = ___getfree( );
        t->dispatch(c, ptr, chunk);
        ptr += chunk;
    }
}
```

Some embodiments of the present invention may include one, or more, of the following features, characteristics and/or advantages: (i) an application that hosts a server registers its interested ports (ports that it uses to listen for clients) in a container configuration file; (ii) this is an information exchange between the hosted service and the container about what is the real port which the application is interested in; (iii) a simple definition is used to implement the configuration: a line separated list of ports with a pre-defined upper limit to the count of ports (for example, 32) beyond which the complexity of managing the ports increases; (iv) the application that acts as a client to this server does not need to make any special settings in the container configuration, as there is no static port which is being created on the client side; (v) at the same time, if the client is part of a chain of microservices it may also act as a server to another microservice client; (vi) so in such cases, the same procedure as that of i through iii of this paragraph is repeated for the endpoint which is acting as the server; (vii) when a socket is opened in the endpoint (server endpoint), the call is intercepted at the container layer; (viii) asserts that this port is indeed registered in the configuration file; (ix) if the port number is not registered in the configuration file, it throws an error, and aborts the program; (x) this is to make sure that all the real connections are well defined and understood by the container rather than causing undefined behavior at runtime; (xi) if the port number is registered in the configuration file, the container makes an entry of the listening socket and the associated port number in its internal data structure as REAL_SERVER_SOCKET; (xii) when the client requests a connection with the server, the request call is intercepted at the container layer; (xiii) the client port (also referred to as ephemeral port) is entered in the container's internal data structure as REAL_PEER_SOCKET at the client side; and (xiv) when the client establishes the connection, the new socket (the one which represents the remote client) also is entered into the container's internal data structure, as REAL_PEER_SOCKET.

In some embodiments of the present invention, the container may include one, or more, of the following features, characteristics and/or advantages to enable multiplying the communication channel by doing the following: (i): communicating with the peer container where the client is hosted with a message to MULTIPLY BEGIN and a range of port numbers as its data; (ii) for example, ports [20,000-21,000]; (iii) the container creates a number of server sockets with the number configurable; (iv) in this example, 1000 sockets are opened; (v) the peer container receives this message and responds to that by opening up 1000 clients to the 1000 ports exposed at the server; (vi) altering all of these sockets to become full-duplex sockets to enable bi-directional data flow; and (vii) both of the containers keep these sockets in their internal data structures as WORKER CHANNELS.

Some embodiments of the present invention may include one, or more, of the following features, characteristics and/or advantages: (i) when I/O is initiated at either endpoints, the payload is transported through the WORKER CHANNELS instead of the REAL_PEER_SOCKETs; (ii) for example, a write is carried out by performing the following; (iii) intercept the write call that is happening on the REAL PEER by cross-checking the file descriptor with the one that is cached internally; (iv) receive the entire data that is asked to be written; (v) for this, the container maintains a large buffer that is allocated in the user space through standard memory allocation routines, allocated on demand based on the demand of the write request; (vi) compute the amount of data which needs to be sent per worker channel; (vii) spread the data across all the sockets that belong to the WORKER CHANNELS; (viii) on the receiving end, individual data is received through individual sockets, and then coalesced into one single data unit; and (ix) when the REAL PEER at the client side initiates a read operation, the call is intercepted and the single data unit is returned to the caller.

Some embodiments of the present invention may include one, or more, of the following features, characteristics and/or advantages: (i) the system call interception is carried out through techniques such as: (a) using a custom library which overrides the designated system calls and use LD_PRELOAD option to override symbols and using a runtime linkage facility to obtain the real operating system symbols as needed, (b) using linker option -ld-wrap=symbol for the network library that implements the network transport protocol, (c) using the implementation specific container abstraction for the network layer that implements the transport protocol in a custom manner, for example, a docket container which implements an overlay protocol for a virtual network communication layer, or (d) any standard techniques known in the art; and (ii) data ordering is performed using a simple sequencing method as follows: (a) when the individual data chunk is dispatched, they are always split and filled into the sockets whose port numbers are in order, and (b) on the receiver, the chunks are coalesced into one large one, based on the data received by reading through the sockets whose port numbers are in the same order.

Some alternative embodiments of the present invention may include one, or more, of the following features, characteristics and/or advantages: (i) the actual number of worker channels that participate in a one-way data transport is decided based on the data chunk volume itself; (ii) for example, if each socket buffer can hold 1 MB of data and the total write request is 32 MB, only 32 worker channels will be exercised where each channel writes exactly 1 MB of data; (iii) in such cases, the number of sockets to be read from is also passed as metadata between the peer containers that participate in the data transport; (iv) only one side of the full-duplex socket is made functional for data transport; (v) this is useful when the participating microservice endpoints follow a true client-server topology with one peer always writing large data and the other side always consuming them (a typical example is a web application with a database backend); and (vi) in this alternative embodiment, the containers can implement simple and static data transport protocol at their respective endpoints.

Figure 5:
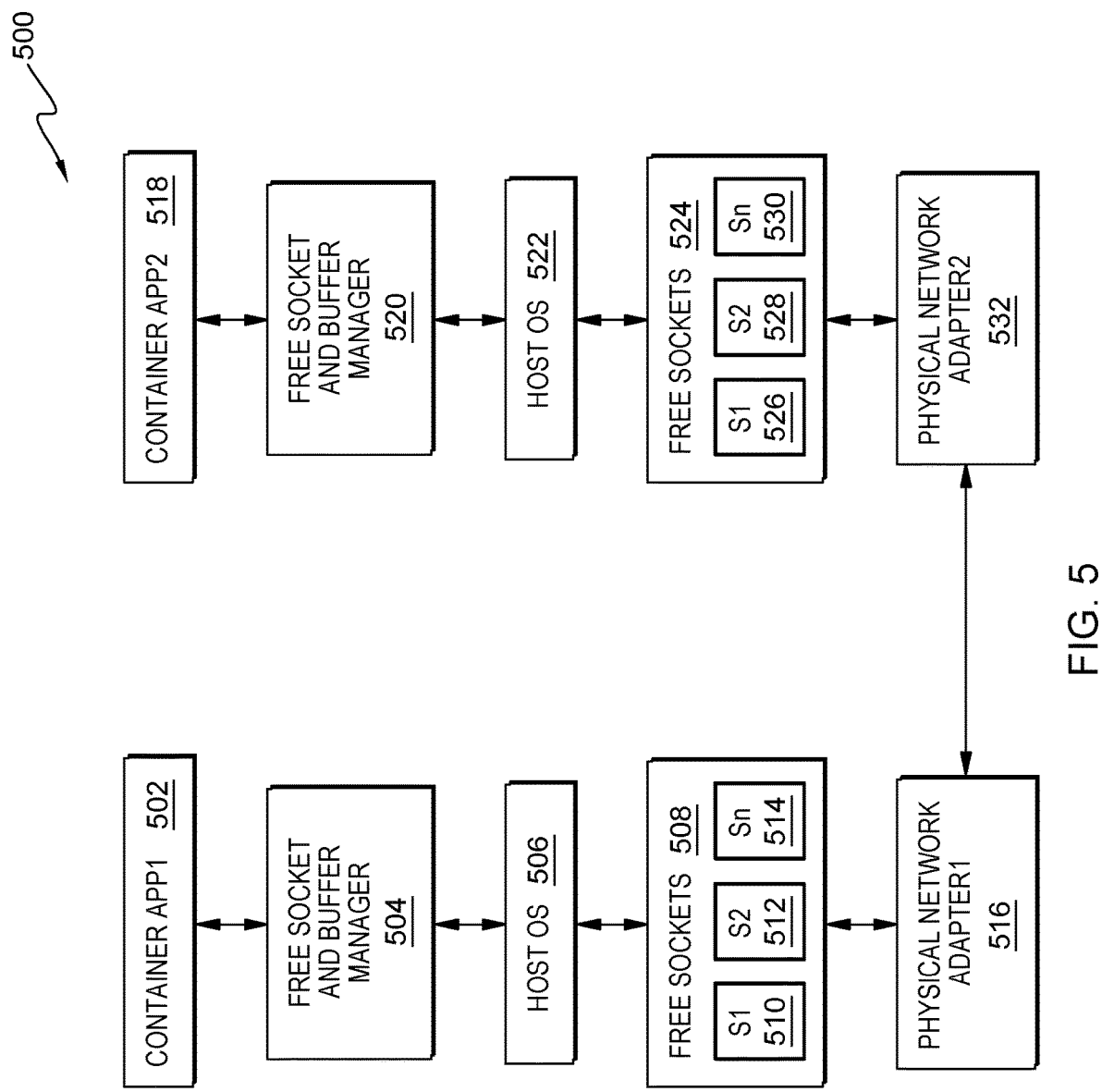
FIG. 5 is a block diagram of relevant components for data flow operations according to the second embodiment system.

An example diagram 500 of an architecture for the data flow optimization described above according to some embodiments of the present invention is depicted in FIG. 5, which will now be described. Diagram 500 includes: (i) a containerized application container app1 502; (ii) a free socket and data buffer manager software module 504; (iii) a host operating system (OS) 506; (iv) a set of free sockets 508, including (a) a first socket S1 510, (b) a second socket S2 512, and (c) a plurality of sockets Sn 514; (v) a physical network adapter1 516; (vi) a containerized application container app2 518; (vii) a free socket and data buffer manager software module 520; (viii) a host operating system (OS) 522; (ix) a set of free sockets 524, including (a) a first socket S1 526, (b) a second socket S2 528, and (c) a plurality of sockets Sn 530; and (x) a physical network adapter2 532.

Some embodiments of the present invention may include one, or more, of the following features, characteristics and/or advantages: (i) when the endpoint (server or client) starts writing (for the first time) into any of the socket that is identified by the REAL_PEER_SOCKET or REAL_SERVER_SOCKET, the virtual machine invokes a dynamic code profiler; (ii) a function of the dynamic code profiler is to trace application code flow from a point the data in its fullest form or in parts is materialized in the calling sequences and that leads up to writing into said socket, but does not transform further other than getting accumulated in an internal buffer; (iii) an end goal of the dynamic code profiler is to dynamically compile the application code modules that impart in the data writes into the socket in such a manner as to eliminate buffering; (iv) write data as early as possible to avoid network latency; and (v) one process for the code flow optimization includes: (a) identify the functions and/or code blocks that impart in said data writing to said socket through dynamic code flow analysis, (b) analyze the call sequences between said functions, (c) detect the transport data flow between and across the control flow edges within the call sequences detected so far, (d) detect data buffering patterns within the control flow edges detected so far, (e) transform the code in such control flow edges so as to inline-write the data fragments into the destination socket by bypassing the original code flow sequences, and (f) implement a light-weight transport protocol between the endpoints to handle exceptions and abnormal program conditions.

Some embodiments of the present invention may include one, or more, of the following features, characteristics and/or advantages: (i) identifying participating functions and blocks are carried out by intercepting the socket operation through REAL_SERVER_SOCKET or REAL_PEER_SOCKET; (ii) analyzing the participating functions is carried out by: (a) walking back the call chain at the current position and aggregate all of the functions found in the call stack, and (b) performing semantic analysis on the code of the participating functions to locate the start and end point for the message data that is subjected to the network transport within the program; (iii) detecting the transport data flow is carried out through standard data flow analysis techniques, which is then analyzed to identify a location in the program at which point the message data is no more transformed in terms of its content; (iv) detecting data buffering patterns is carried out by one or both of: (a) data flow analysis or copy propagation techniques, or (b) a custom pattern searching algorithm that identifies and records a program point where the message data is stored in a program variable of larger scope than the message data itself that leads up to the socket operation; (v) in-line writes are carried out by modifying the program at the identified buffering point in such a manner that the code directly operates on the socket with the partial data thus obtained rather than (or in addition to) accumulating in a buffer; (vi) discarding the code sequences that operates on the socket with the buffer data at the end; (vii) continuing with the rest of the program/application; (viii) a lightweight protocol is implemented between container endpoints to make sure that instantaneous data flow is not committed immediately into the target endpoint, instead waiting for a signal from the source endpoint to do so; and (ix) this eliminates the chances of abnormal program situations (such as crashes) in the source application leaving the target host with an undesired state with committed message data.

Some embodiments of the present invention may include one, or more, of the following features, characteristics and/or advantages: (i) improve the network throughput between two containers that host a logically connected microservices; (ii) improvement is realized through emulation of a plurality of artificial communication channels between endpoints; (iii) microservices that communicate over a predefined endpoint are pre-registered with the hosting container; (iv) artificial communication channels are comprised of a number of connected endpoints established by the peer containers; (v) I/O operations requested by an application are intercepted at the container level and routed them through the artificial channels; (vi) data chunks are split into multiple smaller chunks and each are transported through individual worker channels; (vii) the smaller chunks are coalesced into a single coherent whole at the receiver endpoint; (viii) the split logic is computed as a function of the volume of the data chunk, the number of artificial channels and the amount of data each channel buffer can hold; (ix) the network latency of the data transport is further improved through elimination of data buffering at the application; (x) the buffering elimination is carried out by transforming the code that manages the data buffering and updating it to perform incremental data writes; (xi) the transformation is performed by a dynamic code compiler that is part of a virtual machine that hosts the microservices; (xii) the code that is subjected for transformation is identified through dynamic code profiling of the application; and (xiii) the dynamic profiler analyses the execution code flow by tracing the route that the data has taken while it materialized in the application up to a point where it is written to the socket that is identified by the system configuration.

Some embodiments of the present invention may include one, or more, of the following features, characteristics and/or advantages: (i) average performance gain is one half of the sum of the minimum performance gain and the maximum performance gain; (ii) for example, for a minimum performance gain, if a single MB of data is being transported from one microservice endpoint M1 to another microservice endpoint M2, M2 is block reading with a 1 MB kernel buffer, and M1 is block writing with a 1 MB kernel buffer, then the data flows through the network immediately, and there is not benefit availed through some embodiments of the present invention; (iii) for an example of maximum gain, if M2 is not reading when M1 is writing, M2's kernel buffer (64 KB) is full, and M1 blocks (waits), or if M2 is reading but M1 is not writing, M2 blocks (waits), then because these two waits solely depends on the application sequences, the performance gain is not measurable; (iv) however if both M1 and M2 are ready, but the kernel buffers for each are 64 KB, then the data is transferred in terms of 64 KB chunks sequentially, such that the data transfer loss (compared to best case) is 1024 KB/64 KB=16; (v) assuming a constant effort for both executing the dynamic profiler and for scatter gatherer logic and giving them very aggressive share (X6) for that, the result is X10 improvements on the performance; (vi) the average improvement between the minimum and the maximum would be X5; (vii) in fully optimized consumption of some embodiments of the present invention, data transport rates can be typically accelerated by X5, with the worst case scenario breaking even with conventional techniques; (viii) the actual improvement in performance is subjected to the volume of data in transit; (ix) embodiments of the present invention apply to internally buffered data as well as unbuffered data transport, which suffers from latency due to: (a) buffering at the TCP layer at both endpoints, and (b) backpressure at both endpoints; and (x) the ability to profile the data flow characteristics of the application still helps to improve transport speeds.

Some embodiments of the present invention may include one, or more, of the following features, characteristics and/or advantages: (i) use normal TCP abstractions to carry out data transfers while applying three novel steps; (ii) first, optimizing the data flow at the sender's side by draining internal buffers from the application with the help of data flow analysis; (iii) second, parallelizing data transport at the network layer by opening up plurality of network sockets that carry data in an incremental manner; (iv) third, optimizing the data flow at the receiver's end by proactively fetching, aggregating and preparing the data at the container level so that it is readily available on application demand; (v) achieve faster data sharing between cloud hosted microservices; (vi) involve data transfer acceleration and communication of large data volumes; (vii) transfer live application data from one running container to another; (viii) using network sockets as the medium and socket buffers as the unit of data; (ix) actual size can vary based on the data flow analysis performed at the source site; (x) sending and receiving large volumes of data by following code and data flow in the sender side, preparing a custom transport plan and executing that; and (xi) transforming buffering sites into a series of incremental data writes.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) for use with a computer network including a plurality of network sockets, the method comprising:
   receiving a software services data set including at least a first service and a second service, where each service includes a corresponding set of machine language and the first and second service are connected by a first network socket;
   determining, through machine logic, for at least the first and second service, that the first service writes a first data set to the second service over the computer network;
   optimizing, automatically and without human intervention through machine logic: (i) at least some of the set of machine language of the first service to write the first data set in a plurality of data set fragments over the computer network, and (ii) at least some of the set of machine language of the second service to receive and recompile the plurality of data set fragments into the first data set, where the size of a given data set fragment is based, at least in part, on socket buffer size of the plurality of network sockets; and
   modifying, automatically and without intervention through machine logic, the computer network to assign, between the first service and the second service a subset of the plurality of network sockets for communicating the plurality of data set fragments in addition to the first network socket, where the number of sockets in the subset is based, at least in part, on the socket buffer size and quantity of data set fragments in the plurality of data set fragments.

2. The CIM of claim 1, further comprising transporting the plurality of data set fragments over the modified computer network.

3. The CIM of claim 2, further comprising responsive to transporting the plurality of data set fragments over the modified computer network between the first service and the second service, recomposing the transported plurality of data set fragments into the first data set.

4. The CIM of claim 3, wherein modifying the computer network further includes:
   filtering at least some network sockets of the plurality of network sockets of the computer network from inclusion in the assigned subset of the plurality of network sockets based, at least in part, on previously assigned usage of the at least some network sockets.

5. The CIM of claim 1, wherein optimizing at least some of the machine language of the second service further includes transforming buffering sites into a series of incremental data writes.

6. The CIM of claim 1, wherein each service of the software services data set is a microservice.

7. A computer program product (CPP) for use with a computer network including a plurality of network sockets, the CPP comprising:
   a machine readable storage device; and
   computer code stored on the machine readable storage device, with the computer code including instructions for causing a processor(s) set to perform operations including the following:
      receiving a software services data set including at least a first service and a second service, where each service includes a corresponding set of machine language and the first and second service are connected by a first network socket,
      determining, through machine logic, for at least the first and second service, that the first service writes a first data set to the second service over the computer network,
      optimizing, automatically and without human intervention through machine logic:
   (i) at least some of the set of machine language of the first service to write the first data set in a plurality of data set fragments over the computer network, and (ii) at least some of the set of machine language of the second service to receive and recompile the plurality of data set fragments into the first data set, where the size of a given data set fragment is based, at least in part, on socket buffer size of the plurality of network sockets, and modifying, automatically and without intervention through machine logic, the computer network to assign, between the first service and the second service, a subset of the plurality of network sockets for communicating the plurality of data set fragments in addition to the first network socket, where the number of sockets in the subset is based, at least in part, on the socket buffer size and quantity of data set fragments in the plurality of data set fragments.

8. The CPP of claim 7 wherein the computer code further includes instructions for causing the processor(s) set to perform the following operations:

transporting the plurality of data set fragments over the modified computer network.

9. The CPP of claim 8, wherein the computer code further includes instructions for causing the processor(s) set to perform the following operations:

responsive to transporting the plurality of data set fragments over the modified computer network between the first service and the second service, recomposing the transported plurality of data set fragments into the first data set.

10. The CPP of claim 9, wherein modifying the computer network further includes:

filtering at least some network sockets of the plurality of network sockets of the computer network from inclusion in the assigned subset of the plurality of network sockets based, at least in part, on previously assigned usage of the at least some network sockets.

11. The CPP of claim 7, wherein optimizing at least some of the machine language of the second service further includes transforming buffering sites into a series of incremental data writes.

12. The CPP of claim 7, wherein each service of the software services data set is a microservice.

13. A computer system (CS) for use with a computer network including a plurality of network sockets, comprising:

a processor(s) set;
a machine readable storage device; and
computer code stored on the machine readable storage device, with the computer code including instructions for causing the processor(s) set to perform operations including the following:

receiving a software services data set including at least a first service and a second service, where each service includes a corresponding set of machine language and the first and second service are connected by a first network socket, determining, through machine logic, for at least the first and second service, that the first service writes a first data set to the second service over the computer network, optimizing, automatically and without human intervention through machine logic:

(i) at least some of the set of machine language of the first service to write the first data set in a plurality of data set fragments over the computer network, and (ii) at least some of the set of machine language of the second service to receive and recompile the plurality of data set fragments into the first data set, where the size of a given data set fragment is based, at least in part, on socket buffer size of the plurality of network sockets, and modifying, automatically and without intervention through machine logic, the computer network to assign, between the first service and the second service, a subset of the plurality of network sockets for communicating the plurality of data set fragments in addition to the first network socket, where the number of sockets in the subset is based, at least in part, on the socket buffer size and quantity of data set fragments in the plurality of data set fragments.

14. The CS of claim 13 wherein the computer code further includes instructions for causing the processor(s) set to perform the following operations:

transporting the plurality of data set fragments over the modified computer network.

15. The CS of claim 14, wherein the computer code further includes instructions for causing the processor(s) set to perform the following operations:

responsive to transporting the plurality of data set fragments over the modified computer network between the first service and the second service, recomposing the transported plurality of data set fragments into the first data set.

16. The CS of claim 15, wherein modifying the computer network further includes:

filtering at least some network sockets of the plurality of network sockets of the computer network from inclusion in the assigned subset of the plurality of network sockets based, at least in part, on previously assigned usage of the at least some network sockets.

17. The CS of claim 13, wherein optimizing at least some of the machine language of the second service further includes transforming buffering sites into a series of incremental data writes.

18. The CS of claim 13, wherein each service of the software services data set is a microservice.

* * * * *